United States Patent
Matsushita et al.

(10) Patent No.: US 9,695,918 B2
(45) Date of Patent: Jul. 4, 2017

(54) GAP EXPANDING METHOD OF BALL SCREW AND FINE MOTION CONTROL ROD DRIVE MECHANISM INCORPORATING GAP EXPANDED BALL SCREW

(71) Applicant: Hitachi-GE Nuclear Energy, Ltd., Hitachi-shi, Ibaraki (JP)

(72) Inventors: Yuuichi Matsushita, Hitachi (JP); Toshihiro Kodama, Hitachi (JP); Kiyoshi Harada, Hitachi (JP); Hirokazu Akatsuka, Hitachi (JP); Takahiro Tsuchiya, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 658 days.

(21) Appl. No.: 14/172,224

(22) Filed: Feb. 4, 2014

(65) Prior Publication Data
US 2014/0230585 A1    Aug. 21, 2014

(30) Foreign Application Priority Data
Feb. 20, 2013  (JP) ................................ 2013-030545

(51) Int. Cl.
*F16H 25/22*  (2006.01)

(52) U.S. Cl.
CPC ..... *F16H 25/2214* (2013.01); *F16H 25/2204* (2013.01); *Y10T 74/18576* (2015.01)

(58) Field of Classification Search
CPC .................................................. F16H 25/2204
(Continued)

(56) References Cited

U.S. PATENT DOCUMENTS 7,281,604 B2 *  10/2007  Murakami ........... B62D 5/0448
                                                     180/444
2004/0182190 A1    9/2004  Murakami et al.
(Continued)

FOREIGN PATENT DOCUMENTS

JP          61-10158 A      1/1986
JP          62-149886 A     7/1987
(Continued)

OTHER PUBLICATIONS

NSK Ball Screw Tutorial. 73 pages. Available on the internet Apr. 9, 2011: https://web.archive.org/web/20110409102948/http://www.nskamericas.com/cps/rde/xbcr/na_en/Ball_Screw_Tutorial.pdf.*
(Continued)

*Primary Examiner* — Jack W Keith
*Assistant Examiner* — Lily C Garner
(74) *Attorney, Agent, or Firm* — Crowell & Moring LLP

(57) ABSTRACT

It is an object of the present invention to provide a gap expanding method of a ball screw for preventing an increase in torque relative to an electric motor due to a protruding bulge caused by generation of a scar on the traveling side of the screw shaft of the ball screw, and to provide a control rod drive mechanism incorporating the gap expanded ball screw. In a ball screw disposed in a control rod drive mechanism, the ball screw has a screw shaft and a ball nut engaged with the screw shaft via travelling balls, and the balls are each configured to have a diameter smaller than that of the existing ball, thereby expanding a gap between a ball traveling side of the screw shaft and the ball and a gap between the ball and a ball traveling side of the ball nut.

2 Claims, 11 Drawing Sheets

(58) Field of Classification Search
USPC .......................................................... 376/228
See application file for complete search history.

(56) References Cited

U.S. PATENT DOCUMENTS

| | | | | |
|---|---|---|---|---|
| 2009/0185651 A1* | 7/2009 | Akatsuka | ................. | G21C 7/14 |
| | | | | 376/258 |
| 2011/0239797 A1 | 10/2011 | Akatsuka et al. | | |

FOREIGN PATENT DOCUMENTS

| | | | |
|---|---|---|---|
| JP | 63-169597 | A | 7/1988 |
| JP | 2-221894 | A | 9/1990 |
| JP | 4-278493 | A | 10/1992 |
| JP | 6-288458 | A | 10/1994 |
| JP | 2000-39052 | A | 2/2000 |
| JP | 2003-329101 | A | 11/2003 |
| JP | 2004-150587 | A | 5/2004 |
| JP | 2004-276775 | A | 10/2004 |
| JP | 2005-76650 | A | 3/2005 |
| JP | 2009-63075 | A | 3/2009 |
| JP | 2009-174941 | A | 8/2009 |
| JP | 2010-179835 | A | 8/2010 |
| WO | WO 2006/045643 | A1 | 5/2006 |

OTHER PUBLICATIONS

Finnish Office Action with Search Report dated Dec. 10, 2014 (Nine (9) pages).
Japanese Office Action dated Jun. 23, 2015, with English translation (Four (4) pages).

* cited by examiner

GAP EXPANDING METHOD OF BALL SCREW AND FINE MOTION CONTROL ROD DRIVE MECHANISM INCORPORATING GAP EXPANDED BALL SCREW

BACKGROUND OF THE INVENTION

1. Field of the Invention

The present invention relates generally to ball screws and control rod drive mechanisms and, more particularly, to a ball screw and a fine motion control rod drive mechanism suitable for applications in an advanced boiling water reactor (ABWR).

2. Description of Related Art

A core in which a plurality of fuel assemblies is loaded is disposed, and coolant (light water) to function also as a moderator exists, inside a reactor pressure vessel (RPV) of the ABWR. Control rods (CRs), each being inserted between each pair of adjacent fuel assemblies, are disposed inside the RPV and control of start and stop of the reactor and an output from the reactor in, for example, reactivity compensation and load following is performed by pulling out the CR from the core and inserting the CR in the core. The CR is connected to a fine motion control rod drive mechanism (CRD) disposed at a bottom portion of the RPV and moved vertically by the CRD.

An exemplary CRD is shown in FIG. 3 of JP-2009-174941-A. The CRD includes an outer tube in which a guide tube is disposed. A ball screw and a hollow piston placed on a ball nut of the ball screw and extending upwardly are disposed inside the guide tube. The hollow piston has an upper end portion connected to a CR. A screw shaft of the ball screw is disposed inside the hollow piston. The ball nut engages with the screw shaft via travelling balls. The screw shaft of the ball screw is connected to a rotational shaft of an electric motor and rotated by the electric motor. The ball nut is moved up or down through the rotation of the screw shaft of the ball screw, which, in turn, causes the hollow piston to move up or down. This results in the CR connected to the hollow piston being inserted in, or pulled out from, a core, so that an output from a reactor is controlled.

SUMMARY OF THE INVENTION

Common ball screws are put into use in an atmospheric environment and lubricant is applied to a ball traveling side and the ball to thereby improve mutual lubricating ability among the screw shaft of the ball screw, the ball nut, and the ball.

The ball screw in the CRD is, however, put into use in an underwater environment and thus no lubricating ability such as that of the common ball screw can be expected therefrom. This creates harsh environmental conditions in friction among the screw shaft of the ball screw, the ball nut, and the ball.

A protruding bulge that may occur on the ball traveling side of the screw shaft of the ball screw depending on friction conditions hampers rotation of the screw shaft, thus increasing torque for rotating the screw shaft.

The present invention has been made to solve the foregoing problem and it is an object of the present invention to provide a gap expanding method of a ball screw for preventing torque of a screw shaft of the ball screw from increasing and to provide a control rod drive mechanism incorporating the gap expanded ball screw.

To achieve the foregoing object, an aspect of the present invention provides a method for gap expanding in a ball screw, the ball screw disposed in a control rod drive mechanism, the ball screw being operative in an underwater environment to convert via a driving shaft rotational motion of an electric motor to vertical motion to thereby move a hollow piston up or down. The ball screw has a screw shaft and a ball nut engaged with the screw shaft via travelling balls, and the balls are each configured to have a diameter smaller than that of the existing ball, thereby expanding a gap between a ball traveling side of the screw shaft and the ball and a gap between the ball and a ball traveling side of the ball nut. The aspect of the present invention further provides a control rod drive mechanism incorporating the ball screw.

The present invention can prevent torque of the screw shaft caused by the protruding bulge on the ball traveling side of the screw shaft of the ball screw from increasing.

DESCRIPTION OF THE PREFERRED EMBODIMENTS

Embodiments of the present invention will be described below.

First Embodiment

A ball screw having a gap expanded by making a ball diameter smaller according to a first embodiment of the present invention is applied to a control rod drive mechanism (CRD), the CRD will be described in detail below with reference to FIG. 1.

Figure 1:
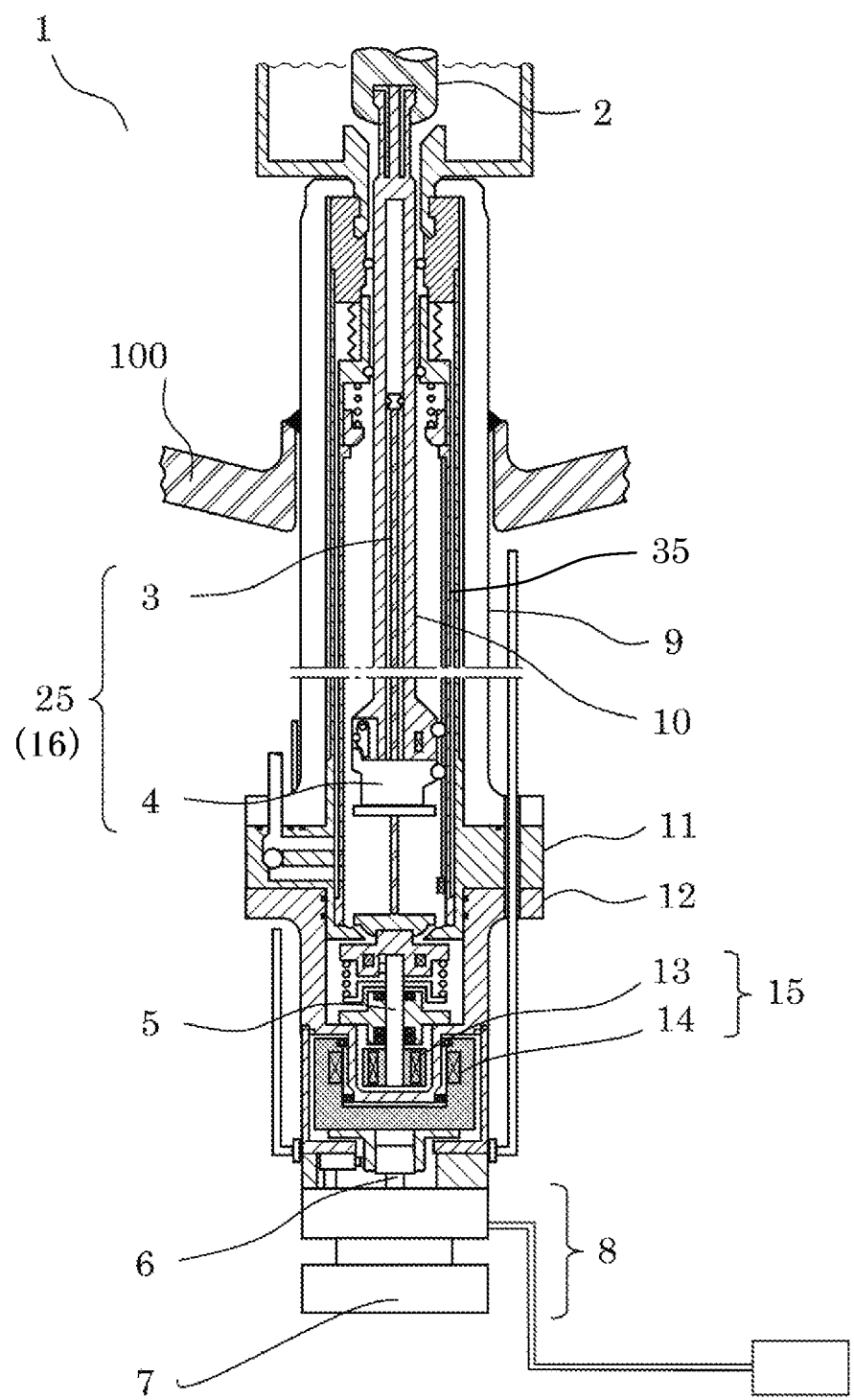
FIG. 1 is a schematic cross-sectional view showing an improved control rod drive mechanism according to a first embodiment of the present invention.

As shown in FIG. 1, this CRD 1 comprises an outer tube 11, a spool piece 12, and a motor unit 8. Specifically, the outer tube 11 is housed inside a CRD housing 9 connected to a lower portion of a pressure vessel 100. The spool piece 12 is disposed beneath the outer tube 11 and has a magnetic coupling 15 that transmits a rotational driving force by a magnetic force via a pressure-resistant section. The motor unit 8 includes an electric motor 7 as a drive source.

A driving shaft 6 at an upper end of the motor unit 8 is connected to an outer magnetic coupling 14 as an element that forms part of the magnetic coupling 15. The outer magnetic coupling 14 is magnetically coupled to an inner magnetic coupling 13 that assumes another element forming part of the magnetic coupling 15 via a pressure bulkhead as the pressure-resistant section of the spool piece 12 at the lower end of the CRD housing 9.

The inner magnetic coupling 13 is connected to a driving shaft 5. A screw shaft 3 of the ball screw is coupled to an upper portion of the driving shaft 5. A guide tube 35 is disposed inside the outer tube 11. A ball nut 4 of the ball screw guide engages with a guide groove (not shown) of the guide tube 35 extending in a vertical direction. Also, the ball nut 4 threadedly engages with the screw shaft 3 via travelling balls. The ball nut 4 is moved up or down through rotation of the screw shaft 3. A hollow piston 10 is placed on an upper surface of the ball nut 4. The hollow piston 10 has a distal end engaging a control rod 2.

The CRD 1 transmits a rotational driving force of the electric motor 7 of the motor unit 8 to the screw shaft 3 via the magnetic coupling 15, to thereby drive to move the ball nut 4 up or down and to thus drive to move the control rod 2 up or down. The up or down movement of the control rod 2 adjusts an insertion amount or an extraction amount relative to a core, to thereby adjust a reactor output.

Figure 2:
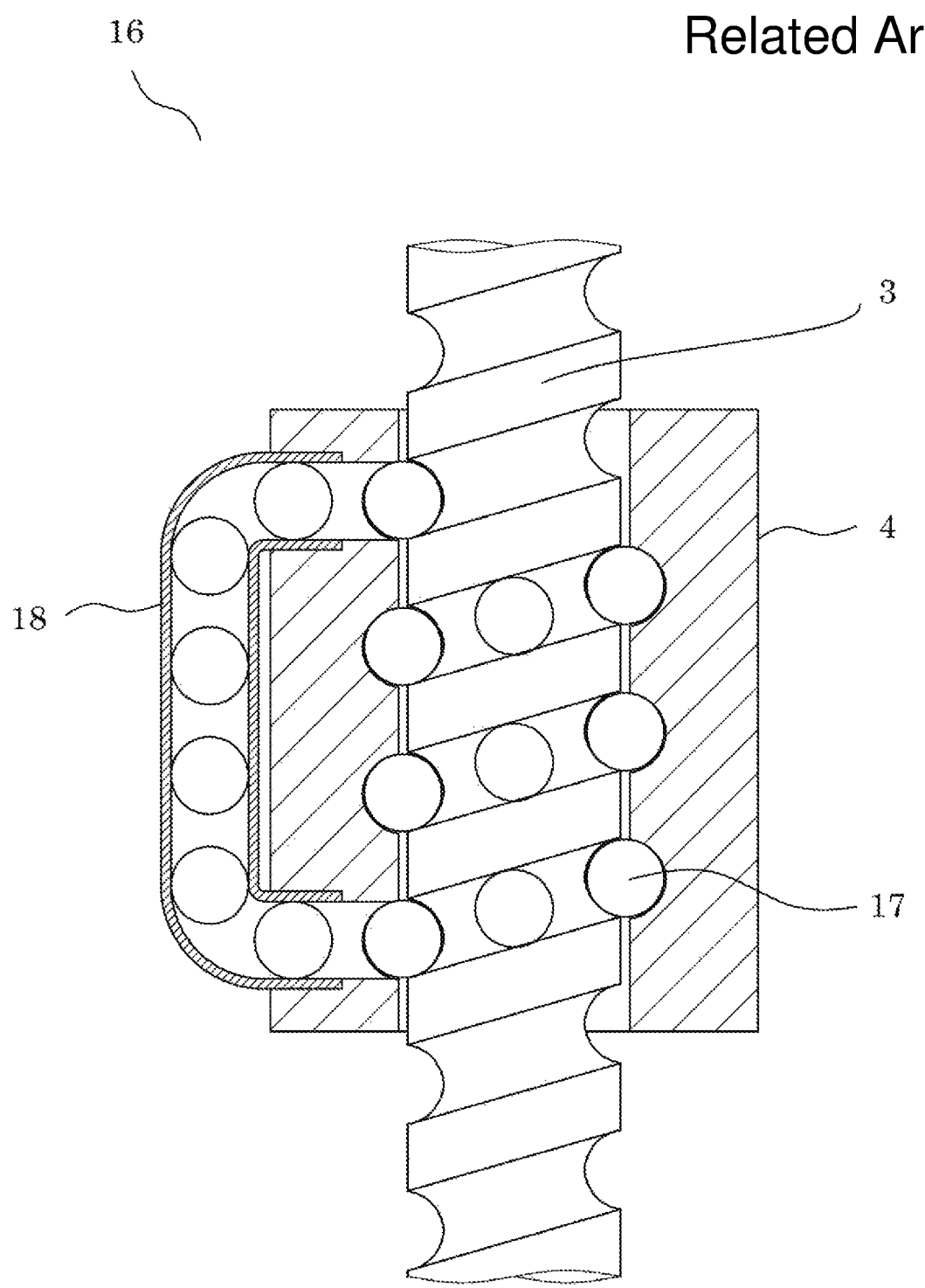
FIG. 2 is a schematic cross-sectional view showing a related-art ball screw.
Figure 3:
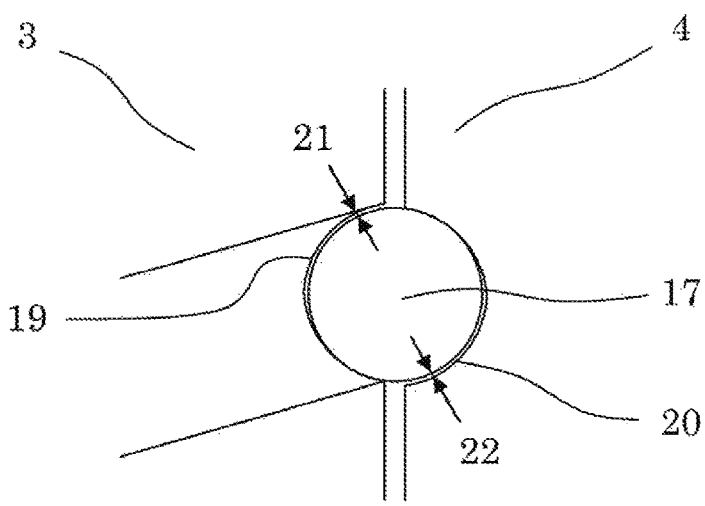
FIG. 3 is a partial schematic cross-sectional view representing mutual relations among a screw shaft, a ball nut, and a ball of the related-art ball screw.

A ball screw 16 of the related art in the CRD 1 will be described below with reference to FIGS. 2 to 4.

The ball screw 16 of the related art includes a screw shaft 3, a ball nut 4, a plurality of balls 17, and a ball tube 18. Mass of the hollow piston 10 and the control rod 2 is loaded on the ball nut 4 in a vertical downward direction. Rotation of the screw shaft 3 causes the ball nut 4 that threadedly engages with the screw shaft 3 via balls 17 to move up or down. During this time, the balls 17 move, while rotating, through the ball tube 18 to thereby make a recirculating motion. A mutual relation here involved is such that the ball 17 rests on a ball traveling side 19 of the screw shaft 3 and a ball traveling side 20 of the ball nut 4 rests on the ball 17. A gap 21 between the ball traveling side 19 and the ball 17 and a gap 22 between the ball 17 and the ball traveling side 20 are each a small one. In a cross-sectional shape, the ball traveling side 19 of the screw shaft 3 and the ball traveling side 20 of the ball nut 4 respectively form a gothic-arch profile; specifically, the shape is a combination of two arcs having centers of curvature different from each other. Additionally, the ball traveling side 19 of the screw shaft 3 and the ball traveling side 20 of the ball nut 4 are symmetrical in shape with each other.

Figure 4:
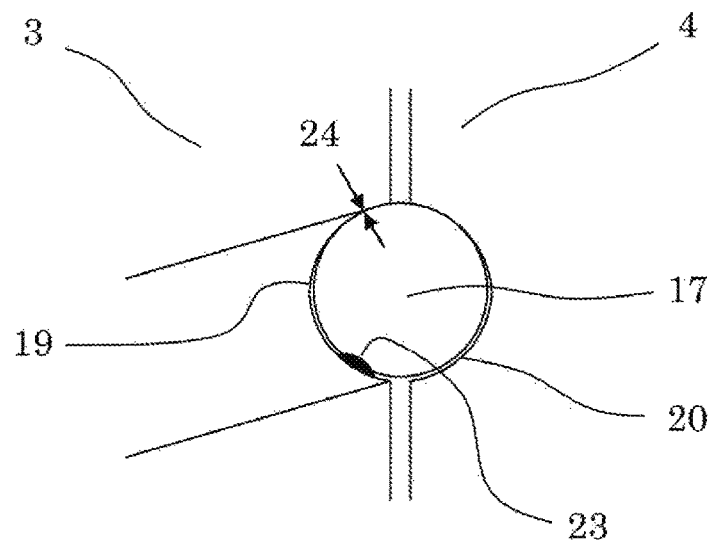
FIG. 4 is a partial schematic cross-sectional view representing mutual relations among the screw shaft, the ball nut, the ball, and a protruding bulge on a ball traveling side of the screw shaft of the related-art ball screw.
Figure 5:
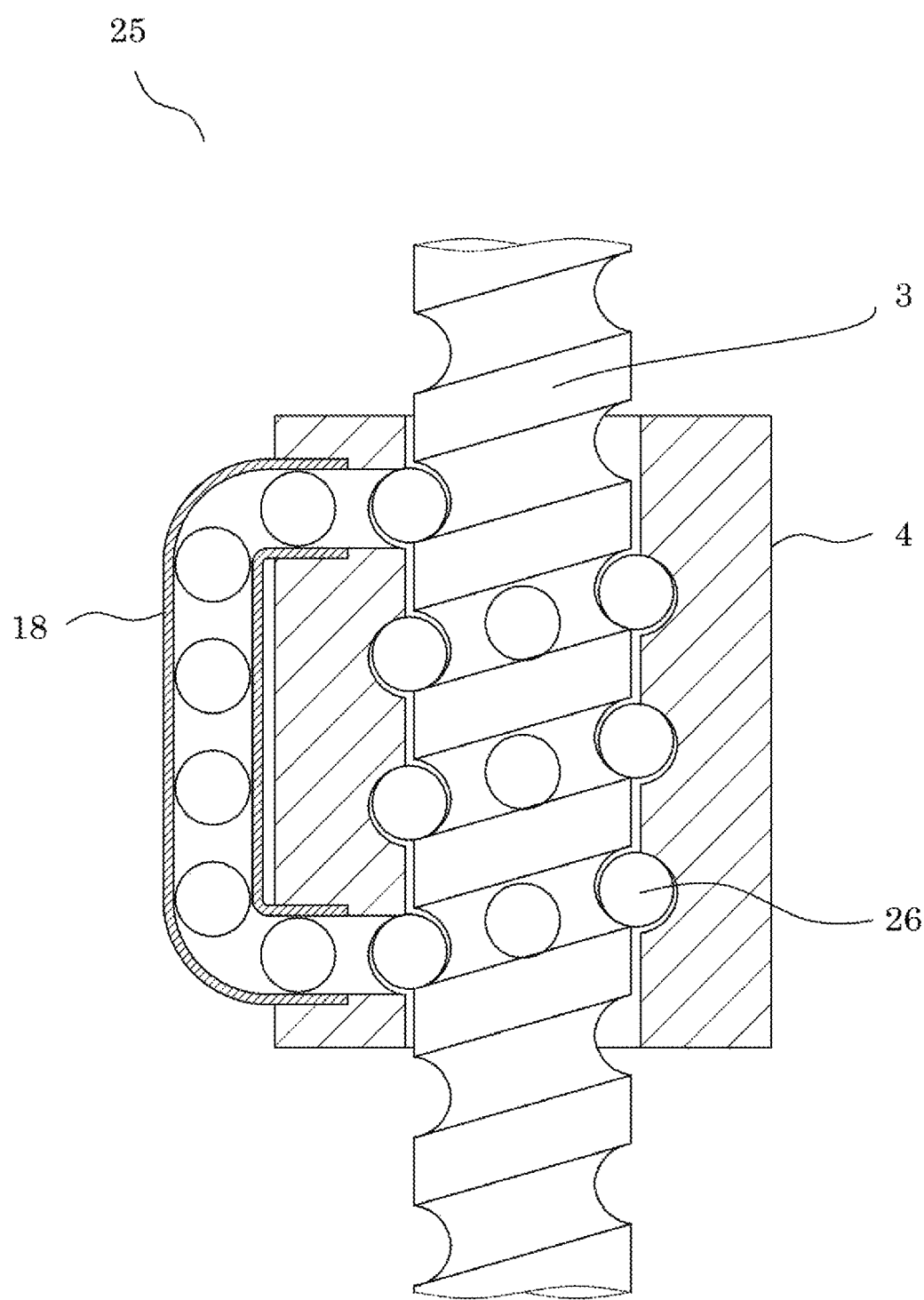
FIG. 5 is a schematic cross-sectional view showing a ball screw according to the first embodiment of the present invention.
Figure 6:
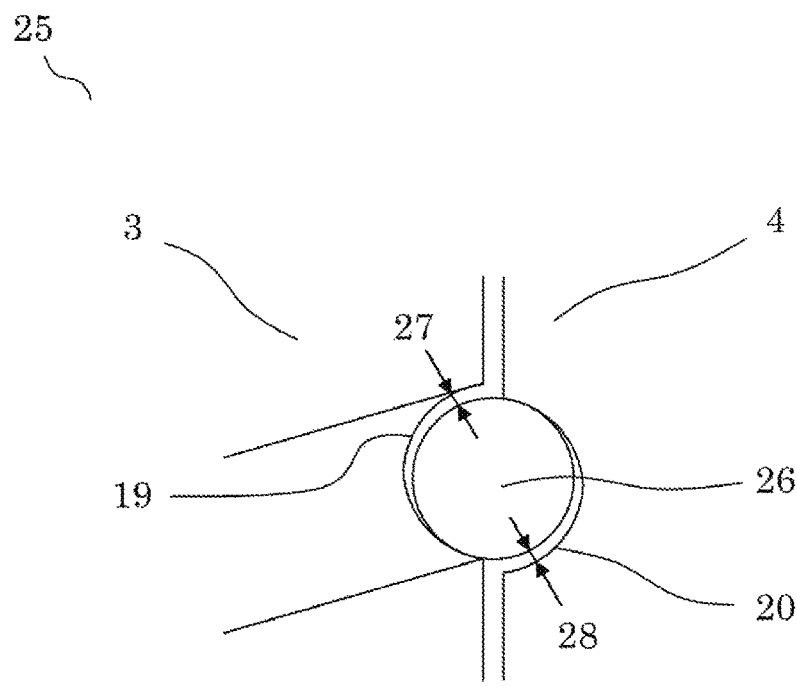
FIG. 6 is a partial schematic cross-sectional view representing mutual relations among a screw shaft, a ball nut, and a ball of the ball screw according to the first embodiment of the present invention.

A protruding bulge 23, if occurring on the ball traveling side 19 of the screw shaft 3, eliminates a gap 21 between the ball traveling side 19 of the screw shaft 3 and the ball 17 (see a reference numeral 24 in FIG. 4). The protruding bulge 23 thus interferes with the ball 17, hampering rotation of the screw shaft 3.

A method for expanding a gap by making a ball diameter smaller of a ball screw 25 in the first embodiment of the present invention in the CRD 1 will be described with reference to FIGS. 5 to 9.

Figure 7:
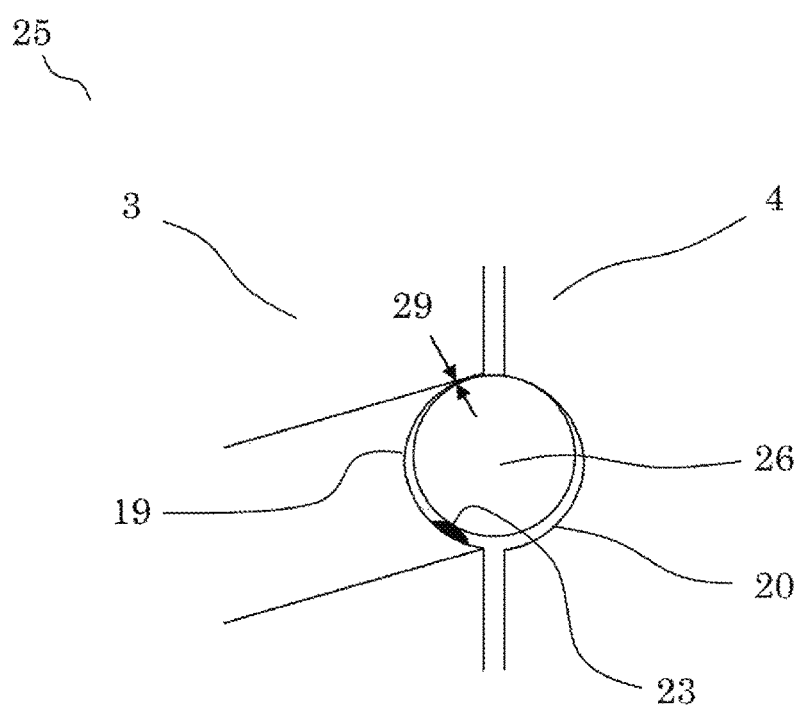
FIG. 7 is a partial schematic cross-sectional view representing mutual relations among the screw shaft, the ball nut, the ball, and a protruding bulge on a ball traveling side of the screw shaft of the ball screw according to the first embodiment of the present invention.

Of the components that constitute the ball screw 16 of the related art, the balls 17 are each manufactured to have a smaller diameter to make a ball 26 and the ball screw 25 having an expanded gap is thereby manufactured. This makes greater a gap 27 between a ball traveling side 19 and the ball 26 and a gap 28 between the ball 26 and a ball traveling side 20. Thus, as shown in FIG. 7, even if the protruding bulge 23 occurs on the ball traveling side 19 of the screw shaft 3, the foregoing arrangement achieves a gap 29 between the ball traveling side 19 of the screw shaft 3 and the ball 26, so that the protruding bulge 23 does not interfere with the ball 26 and torque of the screw shaft 3 is prevented from increasing.

Figure 8:
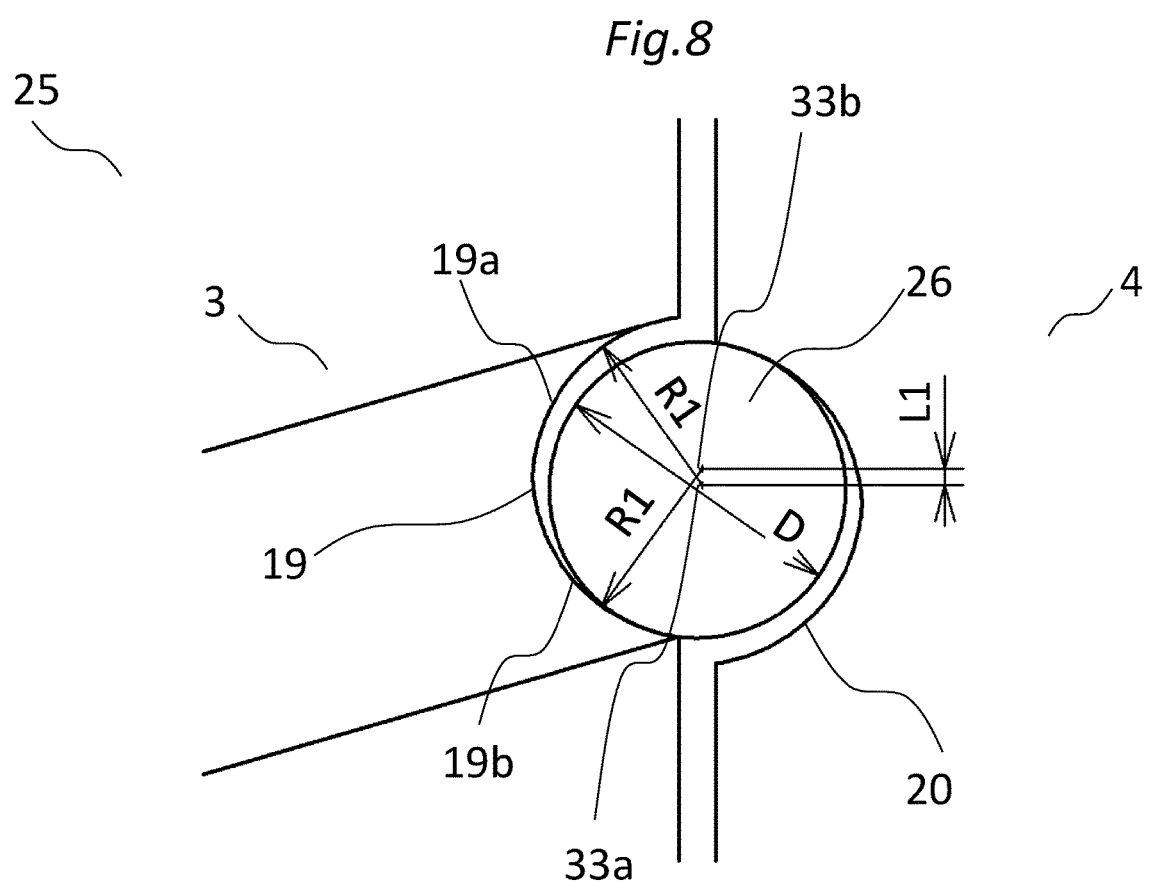
FIG. 8 is a partial schematic cross-sectional view for explaining a gap coefficient A1 in the first embodiment of the present invention.
Figure 9:
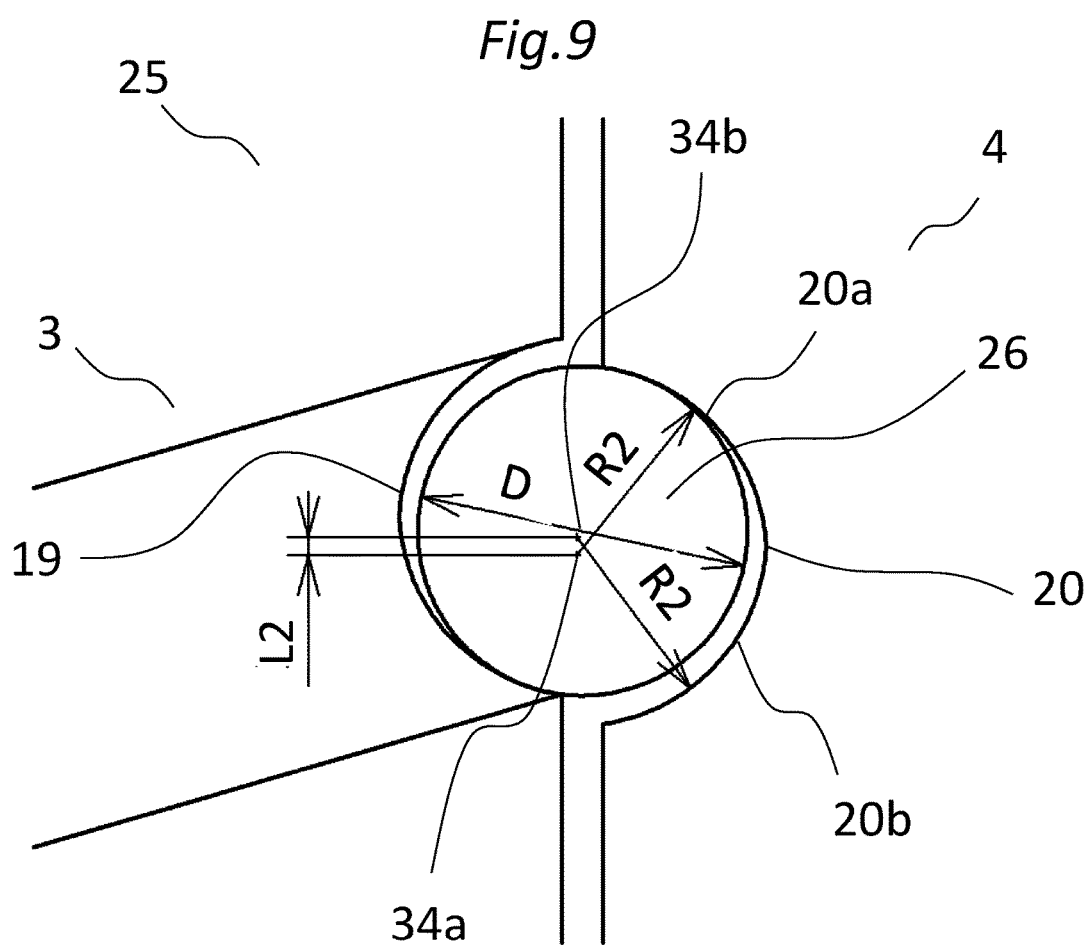
FIG. 9 is a partial schematic cross-sectional view for explaining a gap coefficient A2 in the first embodiment of the present invention.

FIGS. 8 and 9 are partial schematic cross-sectional views representing mutual relations among the different elements of the ball screw 25. In the ball screw 25, the ball traveling side 19 of the screw shaft 3 and the ball traveling side 20 of the ball nut 4 exhibit groove shapes as shown in FIGS. 8 and 9. Let R1 be a distance between a curved surface 19a forming the ball traveling side 19 of the screw shaft 3 and a curvature center point 33a thereof. Then, a distance between a curved surface 19b forming the ball traveling side 19 of the screw shaft 3 and a curvature point 33b thereof is also R1. Let L1 be a distance between the curvature center point 33a of the curved surface 19a and the curvature center point 33b of the curved surface 19b, and let D be a diameter of the ball 26. Then, a gap coefficient A1 is given by the following expression.

$$\text{Gap coefficient } A1 = ((2 \times R1 - L1) - D) \div (2 \times R1 - L1)$$

Let R2 be a distance between a curved surface 20a forming the ball traveling side 20 of the ball nut 4 and a curvature center point 34a thereof. Then, a distance between a curved surface 20b forming the ball traveling side 20 of the ball nut 4 and a curvature point 34b thereof is also R2. Let L2 be a distance between the curvature center point 34a of the curved surface 20a and the curvature center point 34b of the curved surface 20b. Then, a gap coefficient A2 is given by the following expression.

$$\text{Gap coefficient } A2 = ((2 \times R2 - L2) - D) \div (2 \times R2 - L2)$$

The gap coefficients A1 and A2 of the ball screw 16 of the related art are currently 0.03. It is noted that making the ball diameter smaller with resultant gap coefficients A1 and A2 of 0.17 or more impedes traveling performance of the ball. Thus, preferably, the gap coefficients A1 and A2 are set to be greater than 0.03 and smaller than 0.17.

As such, by keeping the gap coefficients A1 and A2 more than 0.03 and less than 0.17, an increase in torque relative to the rotation of the screw shaft 3 caused by the protruding bulge 23 on the ball traveling side 19 can be suppressed without sacrificing the traveling performance of the ball.

An increase in torque relative to the rotation of the screw shaft 3 caused by the protruding bulge 23 on the ball traveling side 19 of the screw shaft 3 can be suppressed by applying the ball screw 25 having the gap expanded by making the ball diameter smaller to the CRD 1 shown in FIG. 1. In addition, the embodiment of the present invention requires that the shape of the balls be changed in the related-art product, permitting applicability to actual machines without having to perform a considerable amount of machining.

Second Embodiment

Figure 10:
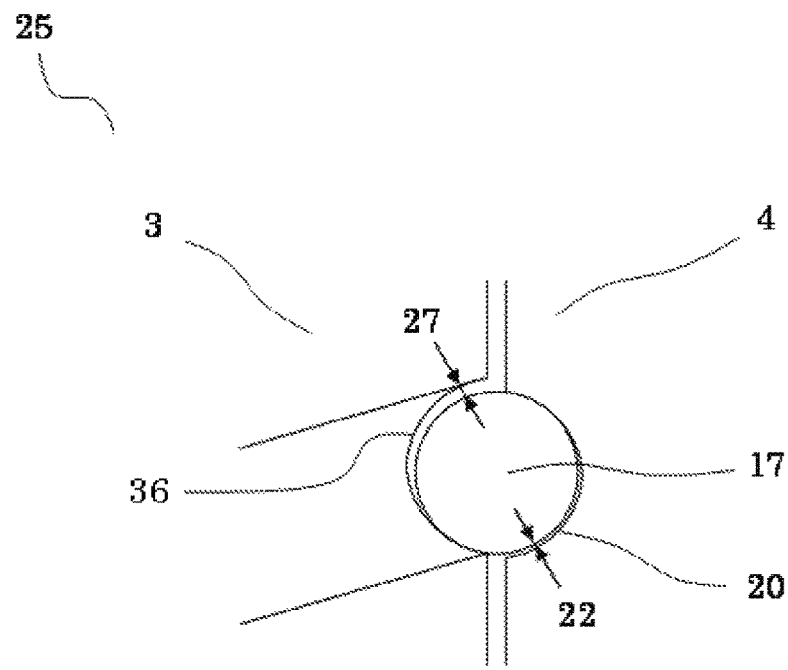
FIG. 10 is a partial schematic cross-sectional view representing mutual relations among a screw shaft, a ball nut, and a ball of a ball screw according to a second embodiment of the present invention.

The following description omits similarities to the arrangements of the first embodiment. In the first embodiment, the balls 17 are machined into the balls 26, each having a smaller diameter than each of the balls 17, to thereby manufacture the ball screw 25 having an expanded gap. In a second embodiment, as shown in FIG. 10, the ball traveling side 19 of the screw shaft 3 of the ball screw 16 is made to exhibit an enlarged groove shape to thereby manufacture a ball screw 25 having an expanded gap. This allows the gap coefficient A1 to incorporate the same value as that specified in the first embodiment.

Figure 11:
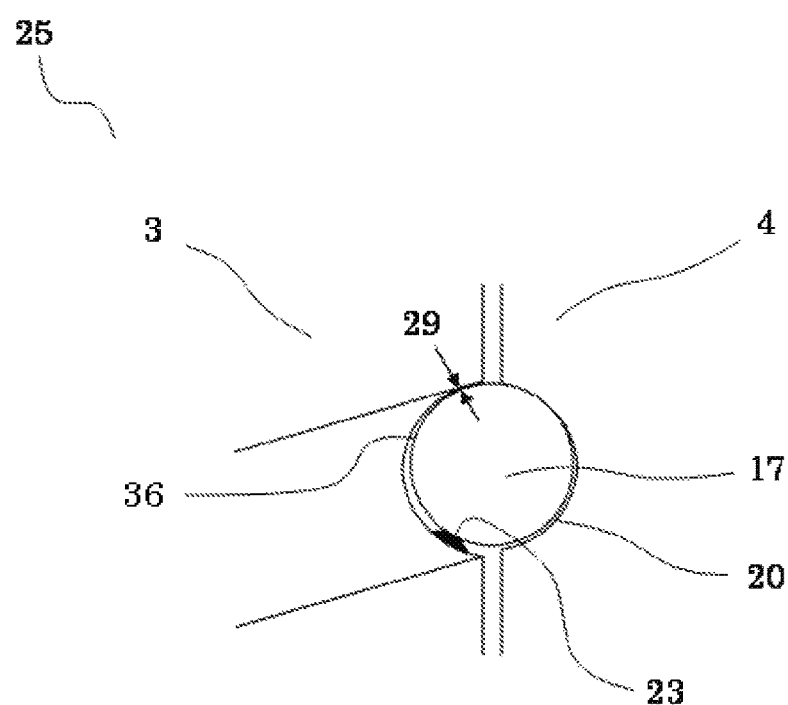
FIG. 11 is a partial schematic cross-sectional view representing mutual relations among the screw shaft, the ball nut, the ball, and a protruding bulge on a ball traveling side of the screw shaft of the ball screw according to the second embodiment of the present invention.

In the second embodiment, as shown in FIG. 10, a gap 27 between a ball traveling side 36 of the screw shaft 3 and the ball 17 is greater. Thus, as shown in FIG. 11, even if the protruding bulge 23 occurs on the ball traveling side 36 of the screw shaft 3, the foregoing arrangement achieves a gap 29 between the ball traveling side 36 of the screw shaft 3 and the ball 17, so that the protruding bulge 23 does not interfere with the ball 17 and torque of the screw shaft 3 is prevented from increasing. Also, although not shown in figures, a gap between the ball 17 and the ball traveling side 20 of the ball nut 4 is greater since the ball 17 can move to the ball traveling side 36 of the screw shaft 3.

In the second embodiment, the effect achieved by the expanded gap in the first embodiment can be achieved. If the shape of the ball cannot be changed, the ball traveling side 19 of the screw shaft 3 may be machined to respond to the requirement.

Third Embodiment

Figure 12:
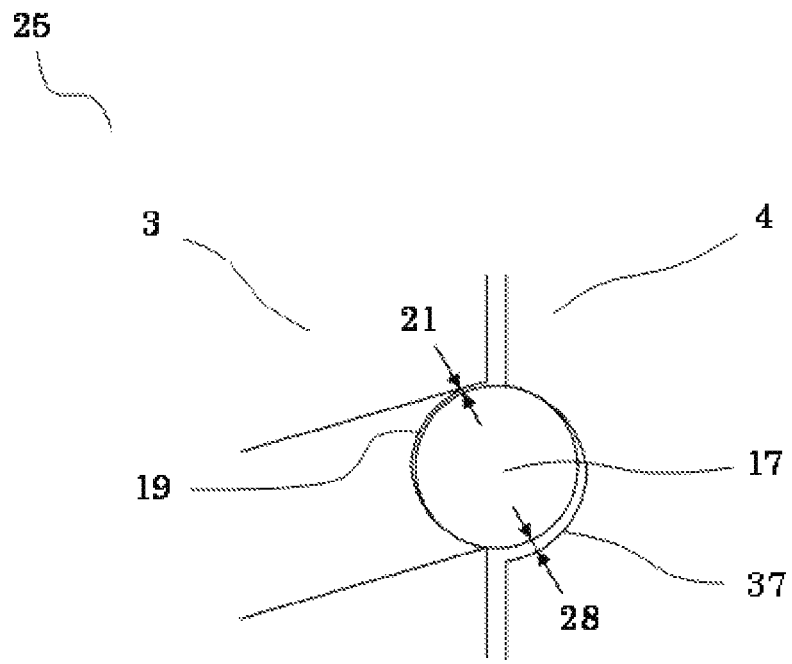
FIG. 12 is a partial schematic cross-sectional view representing mutual relations among a screw shaft, a ball nut, and a ball of a ball screw according to a third embodiment of the present invention.

The following description omits similarities to the arrangements of the first embodiment. In the first embodiment, the balls 17 are machined into the balls 26, each having a smaller diameter than each of the balls 17, to thereby manufacture the ball screw 25 having an expanded gap. In a third embodiment, as shown in FIG. 12, the ball traveling side 20 of the ball nut 4 is made to exhibit an enlarged groove shape to thereby manufacture a ball screw 25 having an expanded gap. This allows the gap coefficient A2 to incorporate the same value as that specified in the first embodiment.

Figure 13:
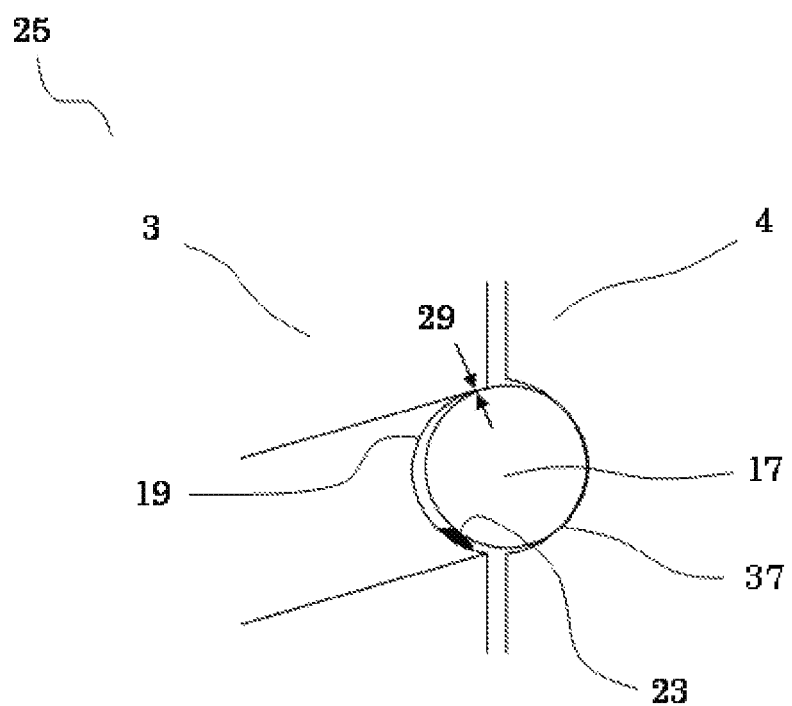
FIG. 13 is a partial schematic cross-sectional view representing mutual relations among the screw shaft, the ball nut, the ball, and a protruding bulge on a ball traveling side of the screw shaft of the ball screw according to the third embodiment of the present invention.

In the third embodiment, as shown in FIG. 12, a gap 28 between the ball 17 and a ball traveling side 37 of the ball nut 4 is greater. Also, a gap between the ball traveling side 19 of the screw shaft 3 and the ball 17 is greater since the ball 17 can move to the ball traveling side 37 of the ball nut 4. Thus, as shown in FIG. 13, even if the protruding bulge 23 occurs on the ball traveling side 19 of the screw shaft 3, the foregoing arrangement achieves a gap 29 between the ball traveling side 19 of the screw shaft 3 and the ball 17, so that the protruding bulge 23 does not interfere with the ball 17 and torque of the screw shaft 3 is prevented from increasing.

In the third embodiment, the effect achieved by the expanded gap in the first embodiment can be achieved. If the shape of the ball cannot be changed, the ball traveling side 20 of the ball nut 4 may be machined to respond to the requirement.

Fourth Embodiment

Figure 14:
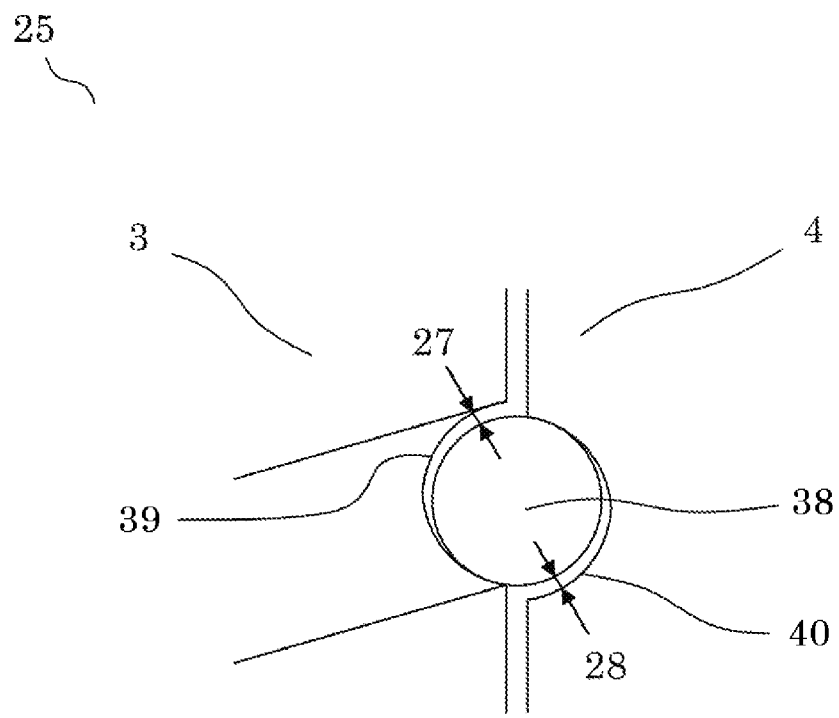
FIG. 14 is a partial schematic cross-sectional view representing mutual relations among a screw shaft, a ball nut, and a ball of a ball screw according to a fourth embodiment of the present invention.

The following description omits similarities to the arrangements of the first embodiment. In the first embodiment, the balls 17 are machined into the balls 26, each having a smaller diameter than each of the balls 17, to thereby manufacture the ball screw 25 having an expanded gap. In a fourth embodiment, as shown in FIG. 14, the balls 17 of the ball screw 16 are machined into balls 38, each having a smaller diameter than each of the balls 17, the ball traveling side 19 of the screw shaft 3 is made to exhibit an enlarged groove shape, and the ball traveling side 20 of the ball nut 4 is made to exhibit an enlarged groove shape, to thereby manufacture a ball screw 25 having an expanded gap. In the fourth embodiment, as shown in FIG. 14, a gap 27 between the ball 38 and a ball traveling side 39 of the screw shaft 3 is greater. And a gap 28 between the ball 38 and a ball traveling side 40 of the ball nut 4 is greater. This allows the gap coefficients A1 and A2 to incorporate the same value as that specified in the first embodiment.

In the fourth embodiment, the effect achieved by the expanded gap in the first embodiment can be achieved. In addition, the fourth embodiment does not require that a substantial change be made in a single component. Thus, only minimal considerations need to be made of, for example, changes in strength in the existing product.

Fifth Embodiment

Figure 15:
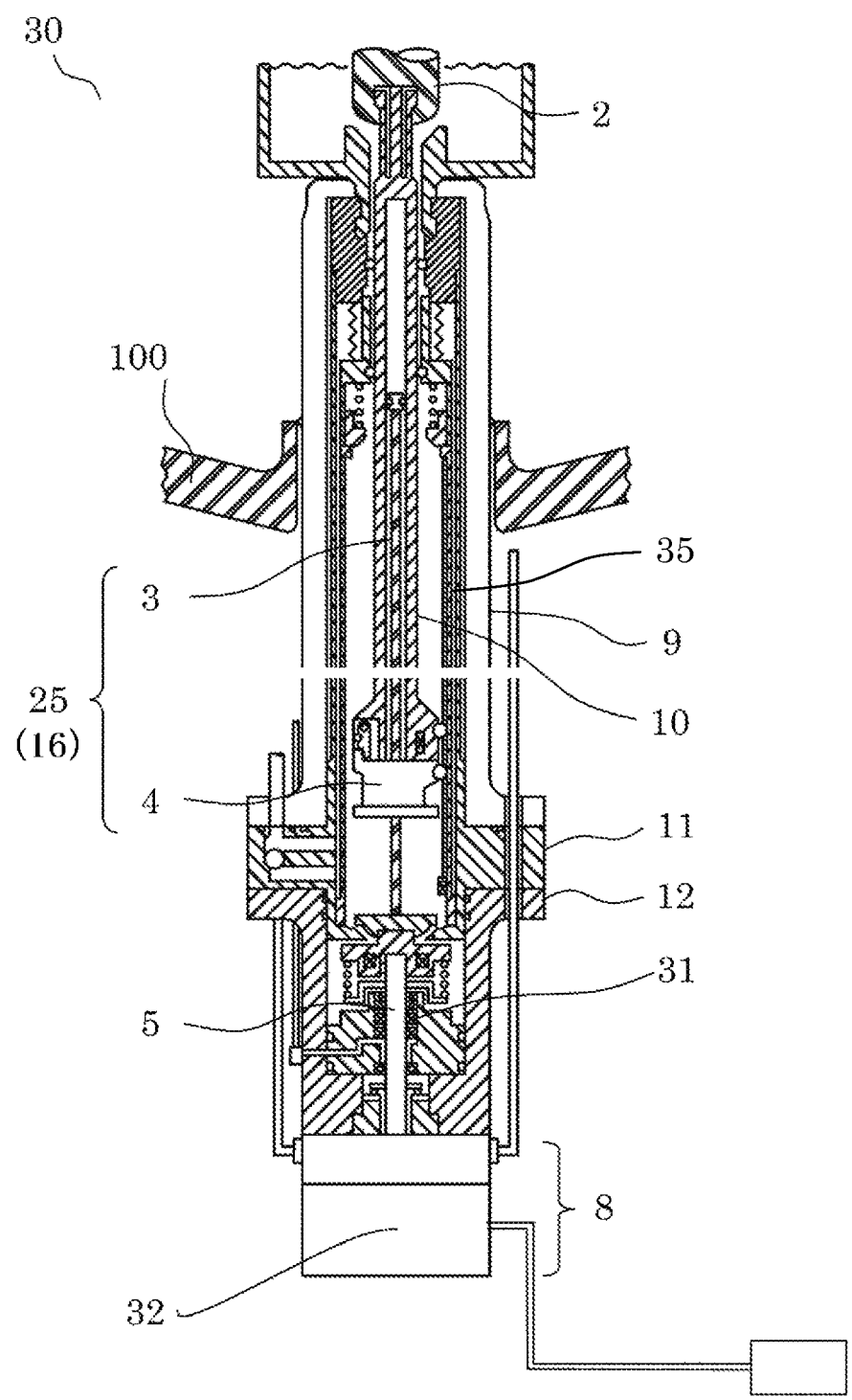
FIG. 15 is a schematic cross-sectional view showing a water-tightly sealed, seal type control rod drive mechanism in which a gland packing is mounted on a rotational shaft driven by an electric motor according to a fifth embodiment of the present invention.

In a fifth embodiment, the ball screw having the expanded gap according to any one of the first to fourth embodiments is applied to a water-tightly sealed, seal type control rod drive mechanism 30 in which a gland packing 31 is mounted on a rotational shaft 6 driven by an electric motor 32 shown in FIG. 15. In this embodiment, too, the effect achieved by the expanded gap in the above-described embodiments can be achieved.

What is claimed is:

1. A method for gap expanding in a ball screw, the method comprising:
disposing the ball screw in a control rod drive mechanism, the ball screw converting via a driving shaft rotational motion of an electric motor to vertical motion to thereby move a hollow piston up or down, wherein
the ball screw has a screw shaft and a ball nut engaged with the screw shaft via traveling balls,
the gap coefficient (A) is given by: $A=((2\times R-L)-D)\div(2\times R-L))$, in which R is a distance between a curved surface forming a ball traveling side and a curvature center point thereof, R being determined for two different curved surfaces, each of the two different curved surfaces having a different curvature center point, L is a distance between the two curvature center points, and D is a diameter of the traveling balls, the gap coefficient is more than 0.03 and less than 0.17, and determining the diameter of the traveling balls to satisfy the expression given by A, in which A has the value of more than 0.03 and less than 0.17, thereby expanding a gap between the ball traveling side of the screw shaft and the traveling balls and a gap between the traveling balls and a ball traveling side of the ball nut.

2. The Method of claim 1, wherein the screw shaft and the ball nut are each configured to have a ball traveling side whose groove shape is made larger.

\* \* \* \* \*